(No Model.) 2 Sheets—Sheet 1.
H. A. ROWLAND & L. DUNCAN.
SYSTEM OF ELECTRICAL DISTRIBUTION.
No. 443,181. Patented Dec. 23, 1890.
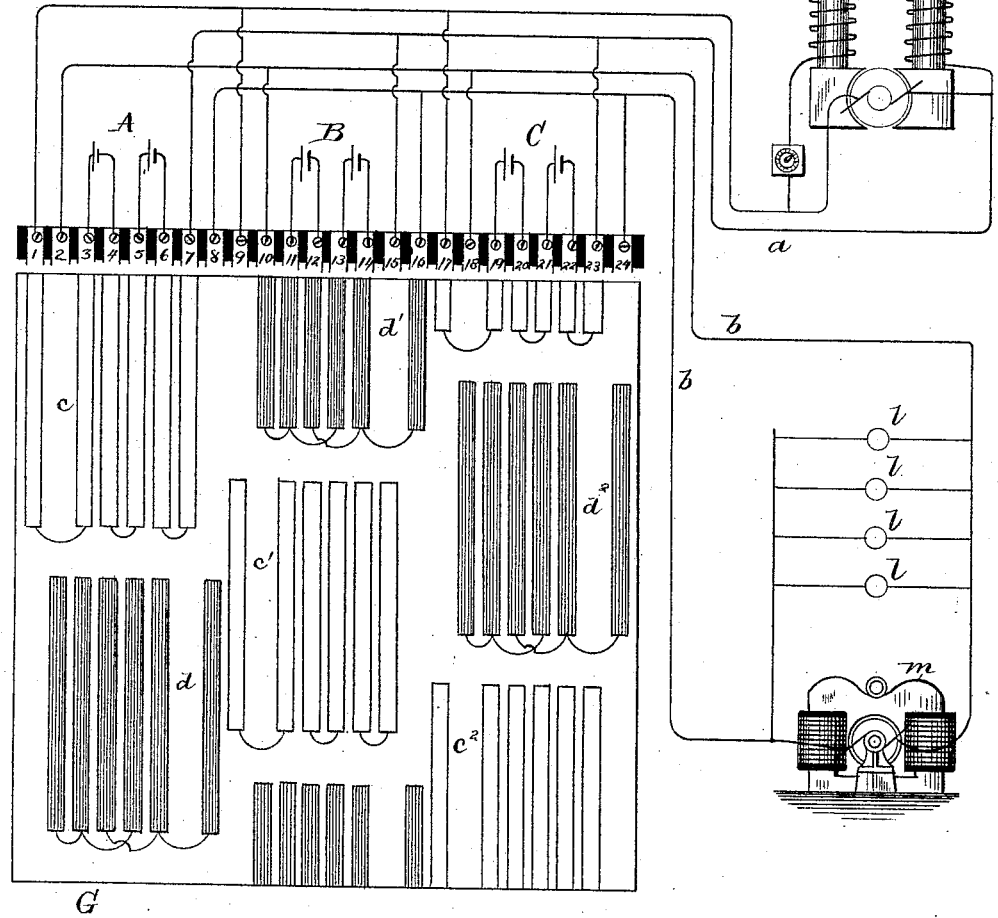

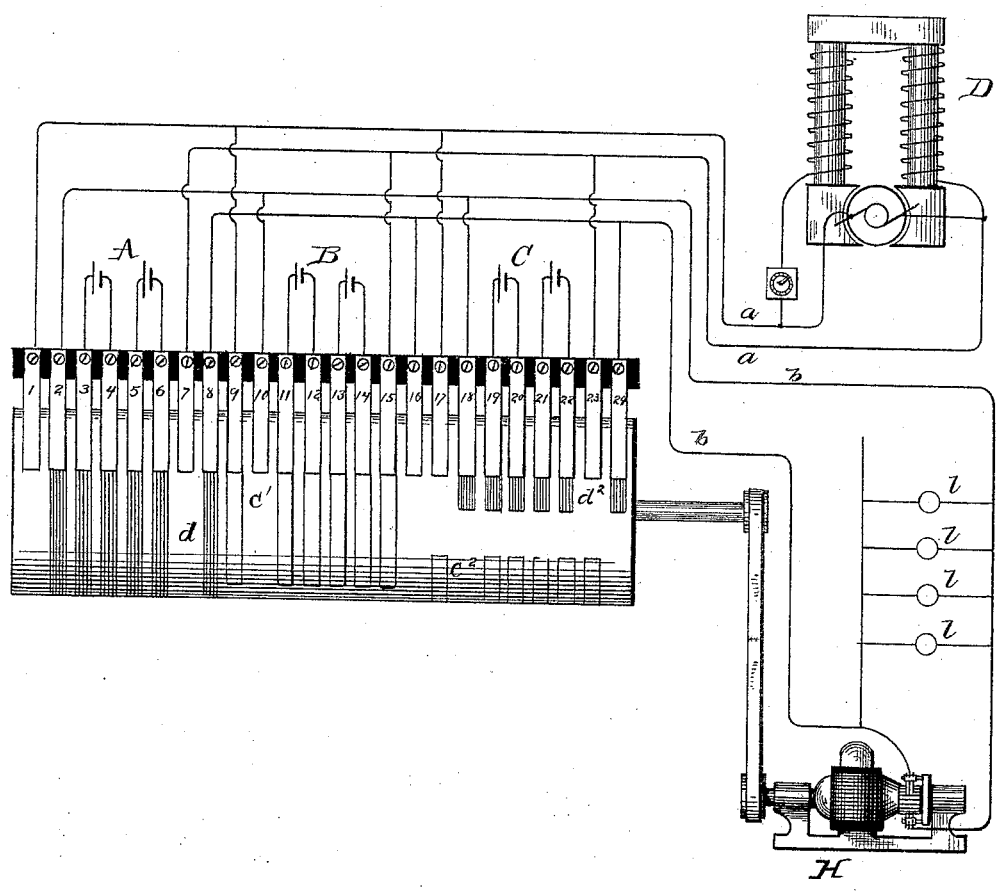

UNITED STATES PATENT OFFICE.

HENRY A. ROWLAND AND LOUIS DUNCAN, OF BALTIMORE, MARYLAND.

SYSTEM OF ELECTRICAL DISTRIBUTION.

SPECIFICATION forming part of Letters Patent No. 443,181, dated December 23, 1890.

Application filed September 10, 1888. Serial No. 285,004. (No model.)

*To all whom it may concern:*

Be it known that we, HENRY A. ROWLAND and LOUIS DUNCAN, both citizens of the United States, and both residing at Baltimore, in the State of Maryland, have invented a certain new and useful Improvement in Systems of Electrical Distribution, of which the following is a specification.

Our invention relates to that class of systems of electrical distribution in which a current of high tension is employed which is conveyed from a distant point to the place where it is to be used, at which place tension-reducers are provided, whereby the high-tension current is converted into one of lower tension suitable for use in incandescent electric lighting and for similar purposes.

More especially our invention relates to those systems in which the tension-reducer consists of a number of secondary batteries provided with a continuously-operating commutator, whereby the connections of the batteries are changed, so that such batteries are alternately charged in series by the high-tension current and discharged in a current of low tension on the consumption or translation circuit.

We so arrange the commutator and the shifting connections that neither the charging nor the discharging circuit is ever broken at any time, but both are always continuous. We do this by dividing the batteries into sets, preferably into three sets, and by using upon the commutator overlapping contact-surfaces, so that before the circuit of any one set of batteries is broken, whether charging or discharging, the circuit of another set is closed. The batteries being made of as low an internal resistance as possible and the connections being changed with great rapidity, the variation in the number of cells connected at any time with the discharging-circuit does not appreciably affect the translating devices.

The invention is illustrated in the accompanying drawings.

Figure 1 is a diagram of the circuits with the commutator-cylinder developed or laid out as a flat surface, and Fig. 2 is a view in elevation of the commutator with a diagram of the circuits connected therewith.

D represents a dynamo-electric machine or other suitable source of continuous current of high tension. From this machine a circuit of conductors $a\ a$ extends, preferably to a distant point, at which the tension-reducer is placed. It is evident, however, that two or more tension-reducers may be connected in multiple arc with this circuit at different points. The commutator of the tension-reducer consists of a cylinder G, made of suitable insulating material and carrying metal contact-strips upon its surface. Upon the surface of the cylinder bear a number of metal springs or brushes, which are numbered in the drawings from 1 to 24.

A B C each represent one of the sets of secondary batteries. There may evidently be any desired number of cells in each set. The cylinder is rotated with a continuous rapid motion by any suitable means, preferably by an electric motor H, which may receive current from either the high-tension or low-tension circuit. It is shown as connected with the low-tension circuit, in which case it would be necessary to start the commutator by hand in beginning the operation of the apparatus.

Connections to the commutator from the high-tension circuit are made as follows: There is a positive and a negative connection for each set of batteries. Those for set A are to springs 1 and 7, those for set B are to springs 9 and 15, and those for set C to springs 17 and 23. The low-tension or discharging circuit $b\ b$ also has two connections to the commutator for each set of batteries, that for set A being to springs 2 and 8, that for set B to springs 10 and 16, and that for set C to springs 18 and 24. The springs, which are intermediate between the charging and discharging springs, are connected in pairs with the secondary batteries. It is evident that there may be any desired number of these intermediate springs, according to the number of secondary batteries in each set, and the number of contact-strips on the cylinder will vary according to the number of springs.

The contact-strips on the cylinder are divided into sets, there being two sets of strips for each set of secondary batteries—one set for charging, the other for discharging. The strips marked $c$, $c'$, and $c^2$ are for charging and are connected in series. The strips $d$, $d'$, and $d^2$ are for discharging, and are connected in multiple arc. The connections between the strips on the cylinder may be made by wires placed upon or under the surface of the cylinder.

When the parts are in the position indicated in Fig. 1, it will be seen that the batteries A are connected in series with the charging-circuit by means of the springs bearing on the strips $c$. The batteries C are also connected in series with the charging-circuit by means of the springs bearing on strips $c^2$. The batteries B are, however, connected in multiple arc with the discharging-circuit by means of the springs which bear on the contact-strips $d'$. It will thus be seen that while the batteries receive a current of high tension from the charging-circuit they discharge a current of low tension on the consumption-circuit, in which circuit the incandescent electric lamps $l$, electric motors $m$, or other translating devices may be placed. When the commutator-cylinder revolves, so that the springs leave the strips $c^2$, the batteries A will still be charging in series while the batteries B are still discharging in multiple arc. The springs will reach the strips $d^2$ before they leave $d'$, so that for a moment batteries B and C will both be discharging in multiple arc while batteries A are still charging in series, after which the springs will leave strips $d'$ and momentarily C will be alone discharging while A is still charging.

It is thought unnecessary to follow all the changes of connection made during the revolution of the cylinder. It will readily be seen that one or more sets of batteries are always in connection with the charging-circuit and one or more sets always in connection with the discharging-circuit, so that neither of these circuits is ever broken.

What we claim is—

1. In a system of electrical distribution, the combination of a source of continuous current of high tension, a circuit extending therefrom, a circuit containing translating devices, and a tension-reducer connected between said high-tension circuit and said translation-circuit and consisting of secondary batteries and a revolving commutator having sets of overlapping contact-strips, and springs bearing thereon and connected with said circuits and said batteries, whereby the battery-connections are changed from series connection with the charging-circuit to multiple-arc connection with the discharging-circuit and said circuits are both kept unbroken, substantially as set forth.

2. In a system of electrical distribution, the combination of a source of continuous current of high tension, a circuit extending therefrom, a circuit containing translating devices, and a tension-reducer consisting of secondary batteries divided into sets, and a revolving commutator having upon it sets of contact-strips, there being two sets for each set of batteries, one having its strips joined in series, the other in multiple arc, and the former having its terminal strips connected with the charging-circuit and the latter with the discharging-circuit and the sets of strips for the different battery-sets overlapping, so that both the charging and discharging circuits are maintained unbroken, substantially as set forth.

This specification signed and witnessed by the said HENRY A. ROWLAND the 16th day of August, 1888, and by the said LOUIS DUNCAN the 22d day of August, 1888.

HENRY A. ROWLAND.
LOUIS DUNCAN.

Witnesses to the signature of Henry A. Rowland:
LUERE B. DEASY,
SETH T. CAMPBELL.

Witnesses to the signature of Louis Duncan:
WM. W. DONALDSON,
THOS. KENT BRADFORD.